Nov. 28, 1944.   I. L. WOLK   2,363,717
METHOD FOR PREVENTING OXIDATION OF RUBBER
Filed Aug. 10, 1943
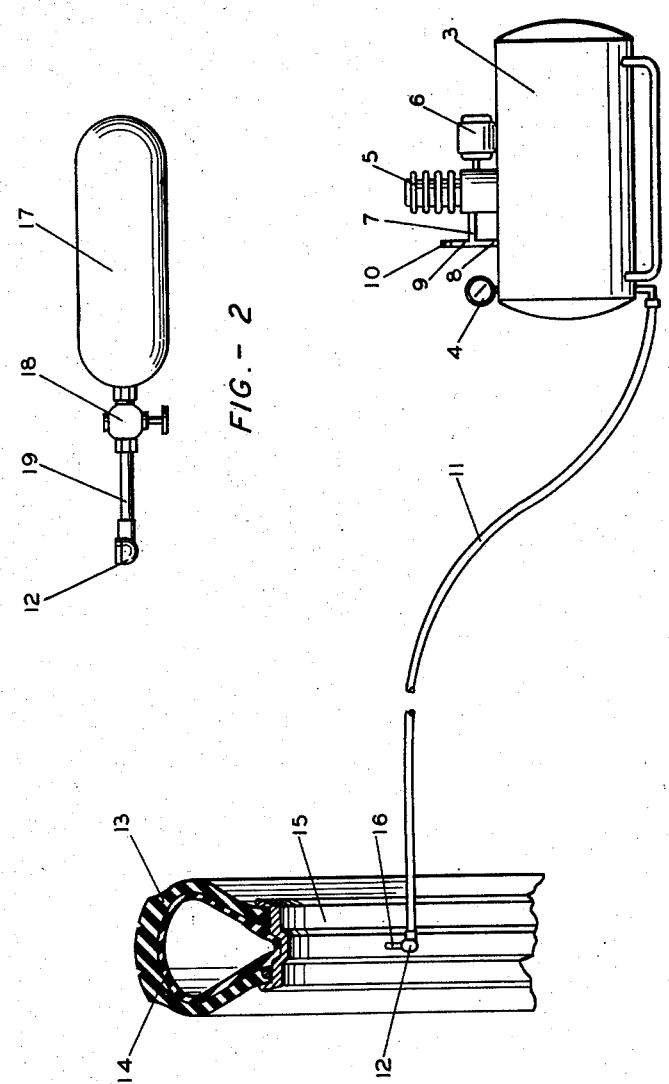
INVENTOR
I.L. WOLK
BY Hudson Young & Yinger
ATTORNEYS Patented Nov. 28, 1944

2,363,717

UNITED STATES PATENT OFFICE 2,363,717

METHOD FOR PREVENTING OXIDATION OF RUBBER

I. Louis Wolk, Bartlesville, Okla., assignor to Phillips Petroleum Company, a corporation of Delaware Application August 10, 1943, Serial No. 498,119

3 Claims. (Cl. 21—2)

The present invention relates to an improved method for preventing attack of oxidizable substances such as rubber and rubber-like materials by oxygen and permitting storage of these materials for substantial periods of time in oxygen-containing atmospheres.

The hydrocarbon nucleus of which rubber is formed is by its very nature vulnerable to attack by oxygen. Studies on the structure of the rubber molecule indicate that there is one double bond to every five carbon atoms, and since one carbon atom in each molecular unit is laterally attached in a methyl group, the double bonds in the carbon chain would actually be on every fourth carbon atom.

By contact with air or other oxygen-containing gases, rubber forms peroxides, and these peroxides, having an auto-catalytic effect, serve as the active agents in the deterioration of rubber. The effect of peroxides, formed by initially contacting rubber with air may be demonstrated by removing the air surrounding a sample of rubber. It has been shown that after suitable contact of rubber with air, the last trace of gaseous oxygen may be removed without stopping the deterioration of the rubber, which continues under the influence of the initially formed peroxides. Similar auto-catalytic oxidation of other substances takes place through the intermediate formation of peroxides.

Air cannot be completely excluded from zones in which rubber is stored or utilized since it diffuses through many materials and enters through leaks or joints. Minute amounts of air or oxygen suffice to initiate substantial catalytic oxidation and even if all the oxygen in contact with the rubber is removed, there would still remain traces of non-volatile peroxides which would continue to have an auto-catalytic effect on the oxidation reaction. It is not sufficient, therefore, to remove oxygen or merely replace it with an inert gas such as $N_2$ or $CO_2$. Peroxides must also be removed or rendered ineffective. This was clearly illustrated by Temple, Caldwell and Mead (J. Ind. & Eng. Chem., Anal. ed. 2 377 (1930)) who exposed vulcanized rubber to compressed oxygen, the exposure being stopped before the first signs of deterioration were visible. Immediately afterward the dissolved gases were eliminated by a high vacuum. The sample freed from dissolved oxygen was identical with a non-oxidized control sample as far as mechanical properties were concerned but differed greatly in resistance to aging. In an accelerated aging test, the oxidized sample deteriorated rapidly on heating in nitrogen while the control did not.

In order to prevent or inhibit oxidative deterioration of rubber and rubber-like materials, the art has developed the incorporation of antioxidants during compounding of rubber, and these materials are more or less effective to prevent internal deterioration of the rubber when exposed to oxygen and other deteriorative factors. The antioxidants act not only by reacting with oxygen, but by catalytically retarding the oxidation reaction and in their presence the oxygen in effect becomes inert.

However effective the incorporation of oxidation inhibitors or antioxidants may be, this still does not serve to effectively prevent surface oxidation of the rubber which is exposed to oxygen-containing atmospheres, particularly under conditions of severe usage, elevated temperatures and long periods of storage. Eventually, antioxidant contained in the rubber adjacent the rubber-air interface, will itself deteriorate or decompose through selective oxidation, thus rendering the rubber surface subject to attack. Furthermore, raw or uncompounded rubber does not contain antioxidants other than those naturally present. The natural antioxidants, while somewhat effective, are not as effective as others which may be used, particularly where the rubber is to be exposed to air for long periods of time. In order to prevent the superficial type of oxidation referred to, it has been proposed to coat the objects with coating compounds containing inhibitors of oxidation. This solution is not completely effective since such coatings may be or become discontinuous, or may themselves be porous to gases, thus permitting attack by oxygen. Furthermore, coatings are difficult to apply and must be frequently renewed, and such coating compositions frequently have solvent or other effects on the rubber surface. In addition such coatings may not be readily applied to the interior of hollow or inflatable objects, such as automobile tires.

It is a principal object of my invention to protect the surface of rubber articles and other oxidizable materials from oxidation. It is a further object of my invention to protect rubber exposed to air or oxygen-containing atmospheres from oxidation by incorporating in said air or atmospheres a suitable proportion of a gaseous oxidation inhibitor. A still further object of the present invention is to protect the interior of hollow or inflatable rubber objects by incorporating with the air utilized for inflation, a minor proportion of a volatile or gaseous antioxidant. Another object of the present invention is to provide for the storage of rubber and similar articles containing oxidizable material by incorporating in the environment or atmosphere in which they are stored, a volatile or gaseous oxidation inhibitor. A still further object is to describe an air inflated object, the interior surface of which will remain relatively unaffected by oxygen over long periods of time.

The terms "rubber" and "rubber-like material" as used in the specification and claims refer to natural and synthetic rubbers and elastomers and other polymers having the elastic properties of rubber. The term "synthetic rubbers" refers to synthetically prepared rubber-like materials particularly those having elastic properties and prepared by polymerization or copolymerization of polymerizable materials. Examples of synthetic rubbers are the Buna rubbers, Butyl rubber, Neoprene, Thiokol, and the like. Other oxidizable materials of natural and synthetic origin, such as synthetic resins, unsaturated oils and the like may also be protected against oxidation in the manner described herein.

The present invention may be practiced by incorporating in the atmosphere or gaseous region to which the rubber or other oxidizable article is exposed, a suitable proportion of an antioxidant which is volatile or gaseous at the particular temperature and pressure involved. For example, inflatable objects such as tires, tubes, balloons, or the like may be inflated with air containing a minor proportion of the antioxidant, also in gas or vapor form. Articles of rubber or other oxidizable material may be stored in receptacles, containers or rooms, into which a small amount or inhibitor has been introduced along with air or other gas. Even where inert gases such as $N_2$ or $CO_2$ are used for storage purposes, introduction of a small amount of inhibitor will suffice to protect the surface of the article against traces of oxygen introduced by leakage or otherwise, or will inhibit auto-catalytic effects of peroxides formed by contact with air prior to utilization of the inert protective gas.

By the utilization of inhibitor in gaseous phase, a number of cooperative results are obtained. The gaseous inhibitor or antioxidant diffuses into the rubber along with any gaseous oxygen present and serves to inhibit any oxidation reactions which may occur, thus retarding the initial formation of peroxides, and additionally inhibiting the auto-catalytic effects of peroxides which may have been formed. The same phenomena occur at the surface of the article whether or not substantial diffusion takes place. In addition to its inhibition of the catalytic oxidation reaction, the antioxidant serves to remove or destroy peroxides formed by initial contact with oxygen, or which may form under conditions of storage or use. This destruction occurs usually by reduction of said peroxides under the reducing action of antioxidants having reducing properties. Even in cases where this reaction is not complete, peroxide formation is minimized.

The volatile inhibitor may be used to protect rubber prior to vulcanization without the necessity of compounding it with inhibitor as is now the case, thus an additional compounding operation is saved. The use of gaseous antioxidant serves also to protect articles containing compounded inhibitor, since the concentration of compounded inhibitor may decrease during use or storage particularly at the surface, through oxidation, but in the presence of the volatile inhibitor such surface oxidation is retarded.

The materials which are effective as gaseous or vapor phase oxidation inhibitors and age-resistors when mixed in relatively small quantities in air or other gases include ammonia gas, hydrogen sulfide, hydrogen cyanide, acetaldehyde, lower alkyl amines having boiling points low enough to place them in the volatile or vapor phase state (the boiling points being given after each one) such as methylamine 19° F., trimethylamine 39° F., dimethylamine 45° F., ethylamine 63° F., isopropylamine 93° F., and methylethylamine 95° F., low boiling mercaptans such as methyl mercaptan 43° F., ethyl mercaptan 97° F., and isopropyl mercaptan 138° F., methyl sulfide 100° F., or dimethylhydrazine (unsymmetrical) 145° F. Somewhat higher boiling inhibitors having substantial vapor pressures at temperatures of storage or operation may also be used.

The range of percentages that are useful is very wide, as minute amounts may accomplish substantial results. Ordinarily from 0.1–10% of antioxidant by weight of total gas may be used, depending on the relative effectiveness of the inhibitor and the conditions of use.

The problem of protecting the interior of inflatable objects is particularly emphasized in the case of automobile and truck tires which may have to be stored for long periods of time. New tires in storage are frequently protected externally by air tight wrappings or coatings but this does not protect the interior thereof. Old tires on cars in storage may remain idle for months or years and thus subject to slow deterioration. Sometimes the external surface may be protected by inhibiting coatings, while the tires themselves may be inflated with inert gas such as $CO_2$ or $N_2$. As indicated above, such measures are not completely effective while being costly and difficult due to the problems involved in removing oxygen while inflating with inert gas, and in preventing entry of traces of oxygen during and after inflation, and the same problems exist with respect to the other hollow or inflatable objects such as life rafts, hose, tubing, etc. It is particularly important to protect the interior of such articles since this is rarely capable of examination as to condition, as is the outer surface. In the case of tires, the volatile antioxidant may remain in the tire during use where it is particularly effective due to the accelerated oxidation which occurs in the interior of tires and tubes as a result of elevated temperatures generated due to friction, hysteresis, etc. Due to poor heat transfer and other factors, the heat generated within the tire cannot be dissipated so that in actual practice the temperature within the tire is substantially higher than that of the exterior, this is especially true with heavy-duty truck tires.

In applying the present invention to pneumatic tires, by way of example, the inhibitor may be introduced in any desired manner, for example by introducing a small amount into the outlet of the air compressor, or by injecting a small amount into the tire by connecting the valve to a pressure cylinder, or by any other desired means. The inhibitor being in vapor phase will protect the inner tube at all times, and if the concentration of inhibitor is substantial, a sufficient amount will continuously migrate through the walls of the inner tube along with any air which passes through the walls due to the inherent porosity thereof, to protect the interior of the casing against deterioration. This is particularly desirable when the tires are in use or are stored in warm weather for long periods of time and will be especially effective where large truck tires are used under such conditions. This is also applicable to other inflatable objects such as life preservers or rubber cushions.

In the drawing:

Figure 1 is an elevational view of an inflating station utilizing a preferred embodiment of my invention for inflating a tire shown partly in cross section and partly broken away.

Figure 2 is an elevational view of another of the inflating devices which may be used in practicing my invention.

With specific reference to Figure 1, a station for inflating such rubber objects as automobile tires is shown which consists of an air tank 3 in which air is kept under pressure for inflating objects. This tank 3 is provided with the usual pressure gage 4, compressor 5, and motor 6 for running the compressor. Air is taken from the atmosphere, compressed in compressor 5 and forced through pipes 7 and 8 into tank 3. I provide an additional pipe 9 leading to an air valve 10 of the tire valve type. Air valve 10 is to allow connection with a source of compressed volatile or vapor phase oxidation inhibitors which may be injected into tank 3 through valve 10. Typical gaseous antioxidants described above may be used, for example, ammonia or methyl mercaptan.

The usual air hose 11 leads from tank 3 to the usual connection 12 which may be placed against the valve of the tire to inflate the same.

As an illustration of an inflatable object, I have shown a truck tire consisting of a casing 13, an innertube 14 and a drop center rim 15. Obviously, other inflatable objects such as rubber gloves, hot water bottles, or life preservers could be used, and obviously in inflating penumatic tires for storage, steel rim 15 may or may not be in place, as considerable pressure can be placed in an innertube either by itself or inside a casing without the presence of any rim.

While I have shown the usual service station tire hose 11 and connection 12 operating on the usual valve 16, it is obvious that for special articles different types of inflation connections can be easily devised without invention.

Figure 2 shows a simple container for volatile or vapor phase oxidation inhibitors. It consists of a metal bottle 17 which is provided with a valve 18, a connecting hose 19 and a valve connecting element which is numbered 12 because it is the same as the usual service station connection of Figure 1.

The material selected as the oxidation inhibitor may be liquefied at ordinary temperatures under pressure, in which case, gas bottle 17 might contain the material in liquid form and upon release of pressure it would take the gaseous form. However, the material may be stored in bottle 17 as a compressed gas.

One method of applying the substances to inflatable rubber objects such as tire 13 would be to have bottle 17 full of compressed vapors of the inhibitor and during the inflation of the tire (at any time at which the pressure differentials would allow, but probably at the start of the inflation) to connect bottle 17 to the tire by means of valve 16 and connection 12 and to thereby pass a relatively small slug of the substance from bottle 17 into the interior of the innertube 14. The remainder of the inflation of the tire would be done with ordinary air and using the ordinary service station compressor or any other source of compressed air.

Another way in which the inhibitor could be injected into the tire would be by connecting bottle 17 to tank 3 through connections 12 and 10. This could be done at any time that bottle 17 was at greater pressure than the air in tank 3 but probably would be done when tank 3 was at a relatively low pressure. By knowing the volume of tank 3 and observing pressure gage 4 it would be easy to calculate the amount of inhibitor added by well known laws of gases, and the pressure could be run up from a predetermined value to another predetermined value to place a predetermined percentage of the inhibitor in tank 3. Then the pressure in tank 3 could be run up to the desired pressure by compressor 5. Tank 3 then being full of air with the proper amount of inhibitor in it could be used freely to inflate entirely through hose 11, connection 12 and valve 16 without any adjustment. This probably would be the best way in most instances as it would not require any particular effort or skill on the part of the persons inflating the tires.

In applying the present invention to inflatable objects which are stored in a deflated condition, such as aircraft, life rafts, etc., the cylinder of compressed gas, such as $CO_2$, $N_2$ or air which is frequently used to inflate the raft may also contain a small amount of the inhibitor which may be present as a compressed gas also, or as liquid under pressure which will volatilize when the pressure is released.

Articles to be protected may in general be stored in packages, containers or chambers in which the atmosphere surrounding said articles contains the desired amount of inhibitor or antioxidant. Such chambers or containers may desirably be sealed or gas-tight. In the case of noninflatable objects that may be stored in warehouses which are not 100% gas tight (as would be necessary if inert gas were used), the warehouse should not leak air at too great a rate, but considerable loss can occur. The inhibitors are added to the air in relatively small quantities and surround the uninflatable objects. As air containing the normal oxygen percentage is present in the warehouse, it may be possible for men to enter the warehouse for inspection or removal of the objects therein without wearing special self-contained oxygen breathing equipment in cases where the antioxidant is non-toxic or is present in non-toxic amounts. In other cases gas masks may be used.

Numerous modifications in the specific inflating apparatus and method will be suggested by this application, and numerous other chemicals suitable to inhibit oxidation, or other aging effects will be brought to mind, but such minor changes are regarded as within the scope of this invention as defined in the following claims.

I claim:

1. The method of preserving a rubber article by inflation which comprises the steps of inflating the article with air during a time period, and at some time closely related to the inflation period injecting a slug of a volatile oxidation inhibitor into the article.

2. The method of preserving a rubber article by inflation which comprises the steps of injecting a slug of a volatile oxidation inhibitor into the article, and then inflating the article with compressed air to the desired pressure.

3. The method of protecting an inflatable object made from an oxidizable rubber-like material subject to deterioration in the presence of free oxygen, which comprises inflating said object with a gas comprising free oxygen and incorporating with the gas contained within said object a suitable proportion of a gaseous oxidation inhibitor.

I. LOUIS WOLK.